US012724426B2

(12) United States Patent
Cui et al.

(10) Patent No.: US 12,724,426 B2
(45) Date of Patent: Sep. 1, 2026

(54) OBSTACLE AVOIDANCE AND DETECTION DEVICE FOR VEHICLE BODY OF FOUR-WAY SHUTTLE AND PALLET, AND WORKING METHOD THEREOF

(71) Applicant: SHANGHAI ZS ROBOTICS CO., LTD., Shanghai (CN)

(72) Inventors: Lei Cui, Shanghai (CN); Jianquan Chen, Shanghai (CN); Fei Wu, Shanghai (CN); Yafeng Ge, Shanghai (CN)

(73) Assignee: SHANGHAI ZS ROBOTICS CO., LTD., Shanghai (CN)

( * ) Notice: Subject to any disclaimer, the term of this patent is extended or adjusted under 35 U.S.C. 154(b) by 0 days.

(21) Appl. No.: 19/416,096

(22) Filed: Dec. 11, 2025

(65) Prior Publication Data

US 2026/0099152 A1 Apr. 9, 2026

Related U.S. Application Data

(63) Continuation of application No. PCT/CN2025/088266, filed on Apr. 10, 2025.

(30) Foreign Application Priority Data

Jun. 11, 2024 (CN) ......................... 202410744264.1

(51) Int. Cl.

| | |
|---|---|
| ***G05D 1/622*** | (2024.01) |
| ***G05D 105/28*** | (2024.01) |
| ***G05D 107/70*** | (2024.01) |

(52) U.S. Cl.

CPC ......... *G05D 1/622* (2024.01); *G05D 2105/28* (2024.01); *G05D 2107/70* (2024.01)

(58) Field of Classification Search

CPC . G05D 1/622; G05D 2105/28; G05D 2107/70

See application file for complete search history.

(56) References Cited

FOREIGN PATENT DOCUMENTS

| | | | |
|---|---|---|---|
| CN | 109335531 A | 2/2019 | |
| CN | 113415561 | 9/2021 | |
| CN | 113415561 A * | 9/2021 | ........... B65G 1/0492 |
| CN | 114006448 A * | 2/2022 | ................ H02J 7/02 |

(Continued)

OTHER PUBLICATIONS

ISR of PCT/CN2025/088266.

*Primary Examiner* — Scott A Browne

*Assistant Examiner* — Josephine Elizabeth Rich

(74) *Attorney, Agent, or Firm* — Hemisphere Law, PLLC

(57) ABSTRACT

An obstacle avoidance and detection device for a vehicle body of a four-way shuttle and a pallet, and a working method thereof are provided. The device includes a four-way shuttle, pallets with goods, and Y direction tracks and an X direction track that are interlaced horizontally and longitudinally. The four-way shuttle can operate in track directions of the Y direction tracks and the X direction track. Shelf supports are arranged on two sides of the Y direction tracks. A vehicle body of the four-way shuttle is provided with distance sensors on front and rear sides in both an X direction and a Y direction. A jacking structure of the four-way shuttle is provided with distance detection sensors on front and rear sides in the Y direction. Collisions between the four-way shuttle and an obstacle or the pallets are avoided.

8 Claims, 10 Drawing Sheets

(56) References Cited

FOREIGN PATENT DOCUMENTS

| | | | | | |
|---|---|---|---|---|---|
| CN | 115352788 | A | | 11/2022 | |
| CN | 115598657 | A | * | 1/2023 | ............. G01S 17/87 |
| CN | 116354015 | | | 6/2023 | |
| CN | 118479183 | | | 8/2024 | |
| CN | 222664454 | | | 3/2025 | |
| WO | 2015131924 | A | | 9/2015 | |

* cited by examiner 20.3:D
20.4:D
20.4:D
20.5:D
24V1
0V1
485A2+
485B2-
-W14
13
-SQ6
24V
0V
485A
485B
1
2
3
4
Pallet Y- obstacle avoidance Sensor

OBSTACLE AVOIDANCE AND DETECTION DEVICE FOR VEHICLE BODY OF FOUR-WAY SHUTTLE AND PALLET, AND WORKING METHOD THEREOF

TECHNICAL FIELD

The present disclosure relates to the field of warehouse transportation vehicles, and in particular, to an obstacle avoidance and detection device for a vehicle body of a four-way shuttle and a pallet.

BACKGROUND

A four-way shuttle is a new type of product in current pallet warehousing logistics. Due to an extremely complex operating environment between shelves for the four-way shuttle, collisions between vehicles cannot be avoided by relying only on a software scheduling system, in particular in an operating process at a cross intersection. Meanwhile, when an inventory management system is chaotic, it cannot ensure correctness of a pallet at each storage position. Consequently, goods collisions occur when the four-way shuttle carrying a pallet arrives at a goods position. This not only causes damage to the vehicle body, but also poses a greater risk in which the vehicle body falls off from a shelf and goods fall off from a shelf.

SUMMARY

Invention objective: To overcome the shortcomings in the existing art, the present disclosure provides an obstacle avoidance and detection device for a vehicle body of a four-way shuttle and a pallet, and a working method thereof, which can detect a distance between another obstacle in an operating direction of the four-way shuttle and the four-way shuttle and detect a pallet on a shelf support of a Y direction track, thus avoiding collision between the four-way shuttle and another four-way shuttle and avoiding collision between the four-way shuttle and the pallet on the shelf support.

Technical solutions: To achieve the above objectives, an obstacle avoidance and detection device for a vehicle body of a four-way shuttle and a pallet of the present disclosure includes a four-way shuttle, pallets with goods, and Y direction tracks and an X direction track that are interlaced horizontally and longitudinally. The four-way shuttle operates in track directions of the Y direction tracks and the X direction track. Shelf supports are arranged on two sides of the Y direction tracks. The pallets are supported on the shelf supports. A vehicle body of the four-way shuttle is provided with an X+ directional distance sensor and an X− directional distance sensor respectively on front and rear sides in an X direction. The vehicle body of the four-way shuttle is provided with a Y+ directional distance sensor and a Y− directional distance sensor respectively on front and rear sides in a Y direction.

The X+ directional distance sensor, the X− directional distance sensor, the Y+ directional distance sensor, and the Y− directional distance sensor respectively detect distances between the four-way shuttle in an operating direction of the four-way shuttle and an obstacle. When the distances reach a first set value, the four-way shuttle slows down; and when the distances reach a second set value, the four-way shuttle stops.

Further, when the four-way shuttle operates on the X direction track, the X+ directional distance sensor and the X− directional distance sensor respectively detect distances between the four-way shuttle and the obstacle in positive and negative directions of the X direction track; and when the four-way shuttle operates on each Y direction track, the Y+ directional distance sensor and the Y− directional distance sensor respectively detect distances between the four-way shuttle and the obstacle in positive and negative directions of the Y direction track.

Further, the four-way shuttle is provided with a liftable jacking structure; the jacking structure is provided with a Y+ distance detection sensor and a Y− distance detection sensor respectively on front and rear sides in the Y direction; when the jacking structure does not perform jacking and the four-way shuttle operates along the Y direction tracks and the X direction track, the four-way shuttle freely shuttles below the pallets; and in a jacking state of the jacking structure, the Y+ distance detection sensor and the Y− distance detection sensor are at the same height as the pallets supported on the shelf supports.

Further, in a jacking state of the jacking structure, the Y+ distance detection sensor and the Y− distance detection sensor respectively detect distances between the pallets on the shelf supports on the Y direction tracks and the four-way shuttle.

Further, the obstacle avoidance and detection device for the vehicle body of the four-way shuttle and the pallet includes an obstacle avoidance and detection circuit for four-way shuttle. The obstacle avoidance and detection circuit for four-way shuttle includes a battery module, a programmable logic controller (PLC) module, and an obstacle avoidance sensor module. The battery module is electrically connected to the PLC module. The PLC module is electrically connected to the obstacle avoidance sensor module. Data detected by the obstacle avoidance sensor module is transmitted into the PLC module through a communication module of the PLC module.

Further, the obstacle avoidance sensor module is composed of the Y+ distance detection sensor, the Y− distance detection sensor, the Y+ directional distance sensor, the Y− directional distance sensor, the X+ directional distance sensor, and the X− directional distance sensor.

Further, positive and negative electrodes of a discharging port of a battery in the battery module are respectively electrically connected to positive and negative electrodes of a DC IN end of a PLC-AP power supplying switch module in the PLC module; and positive and negative electrodes of a DC OUT end of the PLC-AP power supplying switch module are electrically connected to the Y+ distance detection sensor, the Y− distance detection sensor, the Y+ directional distance sensor, the Y− directional distance sensor, the X+ directional distance sensor, and the X− directional distance sensor.

Further, a working method of the obstacle avoidance and detection device for the vehicle body of the four-way shuttle and the pallet includes: when the jacking structure of the four-way shuttle does not perform jacking and the four-way shuttle operates on the X direction track or each Y direction track, detecting a distance between the four-way shuttle on the X direction track and an obstacle in real time by the X+ directional distance sensor and the X− directional distance sensor, or detecting a distance between the four-way shuttle on the X direction track and the obstacle in real time by the Y+ directional distance sensor and the Y− directional distance sensor; when it is detected that the distance between the four-way shuttle and the obstacle reaches a first set value, causing the four-way shuttle to slow down; when it is detected that the distance between the four-way shuttle and the obstacle reaches a second set value, reducing a speed of the four-way shuttle to 0;

when the jacking structure of the four-way shuttle jacks the pallets and the four-way shuttle operates on the X direction track, detecting distances between the pallets on the shelf supports of the Y direction tracks and the four-way shuttle in real time by the Y+ distance detection sensor and the Y− distance detection sensor on the jacking structure, obtaining a quantity of pallets on the shelf supports based on the detected distances, and determining, based on the quantity, whether the pallets with goods which are placed on the shelf supports are abnormal; when the four-way shuttle operates on each Y direction track, detecting whether the pallets which are placed on the shelf supports are abnormal; detecting distances between the pallets on the shelf supports of the Y direction tracks and the four-way shuttle in real time by the Y+ distance detection sensor and the Y− distance detection sensor; when the detected distances reach the first set value, causing the four-way shuttle to slow down; and when the detected distances reach the second set value, causing the four-way shuttle to stop.

Further, when the jacking structure of the four-way shuttle jacks the pallets, the Y+ directional distance sensor, the Y− directional distance sensor, the X+ directional distance sensor, and the X− directional distance sensor still detect the distance between the four-way shuttle and the obstacle in real time to determine whether the distance reaches the first set value or the second set value, to slow down or stop the four-way shuttle.

Beneficial effects: According to the obstacle avoidance and detection device for the vehicle body of the four-way shuttle and the pallet and the working method thereof of the present disclosure, by arranging the two distance detection sensors in the Y direction of the jacking structure of the four-way shuttle, in the jacking state of the jacking structure, the two distance detection sensors detect the distances between the pallets on the Y direction tracks and the four-way shuttle to determine the quantity of the pallets, so as to determine whether stacking of goods on a detected Y direction track has an error. Meanwhile, the two distance sensors can determine, by detecting the distances between the pallets and the four-way shuttle, whether to slow down or stop the four-way shuttle, thus avoiding goods on the pallets from colliding with goods on the shelf supports when the four-way shuttle jacks the pallets. The distance sensors are respectively arranged in four directions of the vehicle body of the four-way shuttle. When the four-way shuttle operates on the X direction track or each Y direction track, a distance between the four-way shuttle and another four-way shuttle or an obstacle is detected to decide to control the four-way shuttle to slow down and brake, thus avoiding the four-way shuttle from colliding with another obstacle and avoiding collision damage to the four-way shuttle. This can prevent collisions between vehicle bodies and collisions between goods on the pallets. Meanwhile, position points at which goods inventories are abnormal can also be identified, and information is reported to an inventory management system, thereby providing a real-time feedback of an inventory error and implementing precise inventory management.

DETAILED DESCRIPTION OF THE EMBODIMENTS

The present disclosure will be further explained below in conjunction with the accompanying drawings.

Figure 1:
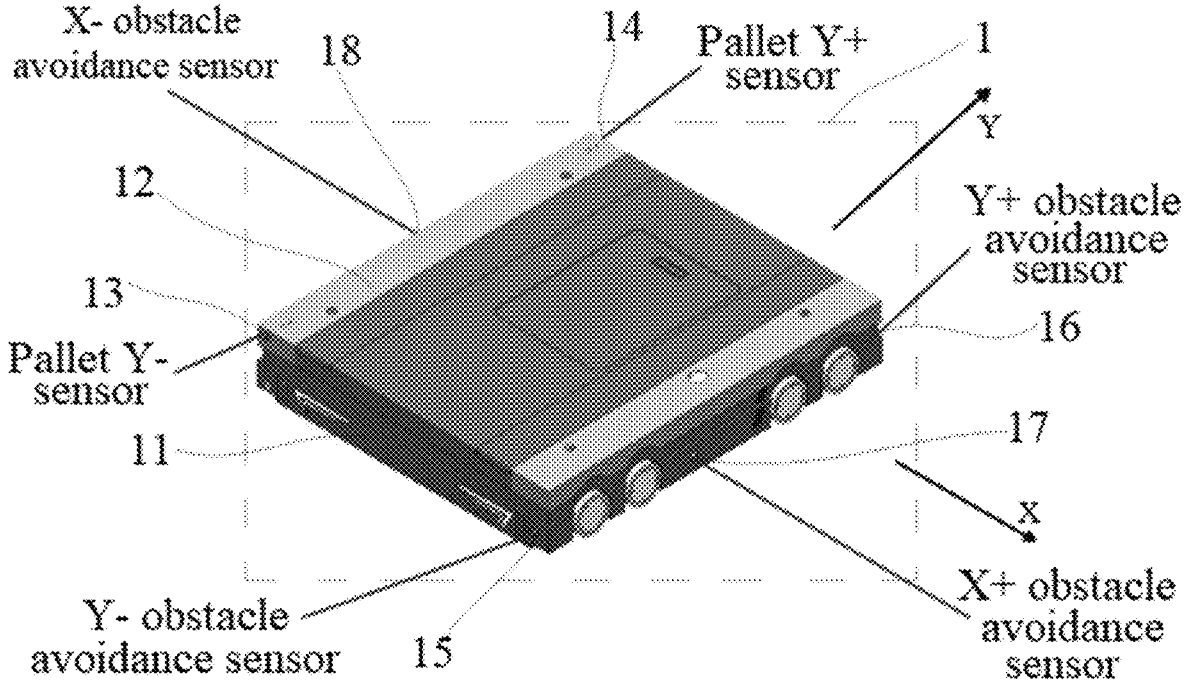
FIG. 1 is a schematic diagram of a four-way shuttle.
Figure 2:
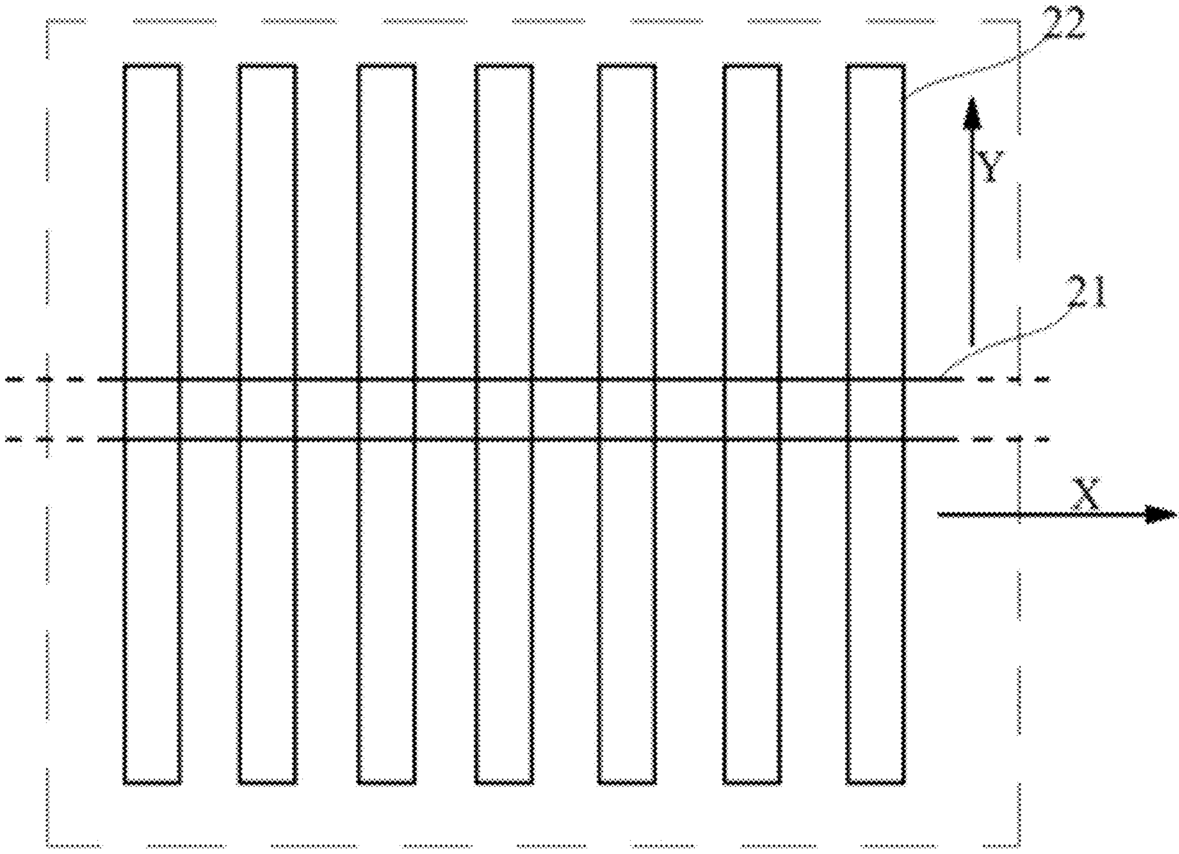
FIG. 2 is a schematic diagram of Y direction tracks and an X direction track that are interlaced horizontally and longitudinally.
Figure 3:
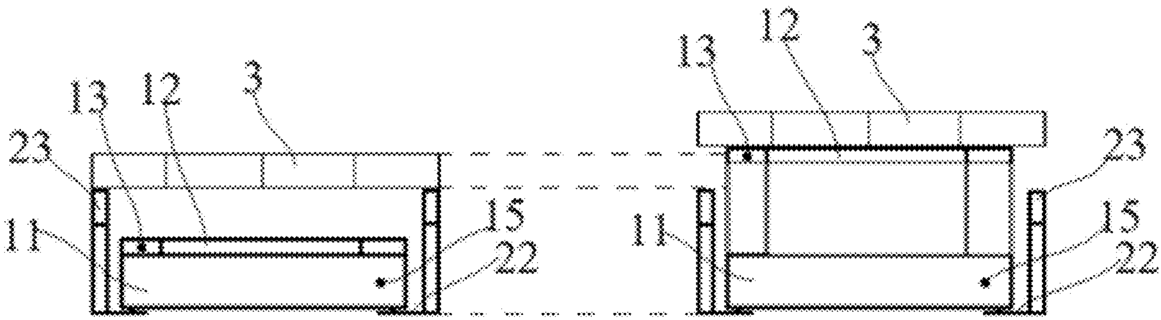
FIG. 3 is a schematic diagram of comparison between a state in which the four-way shuttle does not jack a pallet on a Y− directional jack and a state in which the four-way shuttle jacks a pallet.

As shown in FIG. 1 to FIG. 3, an obstacle avoidance and detection device for a vehicle body of a four-way shuttle and a pallet includes a four-way shuttle 1, pallets 3 with goods, and Y direction tracks 22 and an X direction track 21 that are interlaced horizontally and longitudinally. The four-way shuttle 1 operates in track directions of the Y direction tracks 22 and the X direction track 21. Shelf supports 23 are arranged on two sides of the Y direction tracks 22. The pallets 3 are supported on the shelf supports 23. A vehicle body 11 of the four-way shuttle 1 is provided with an X+ directional distance sensor 17 and an X− directional distance sensor 18 respectively on front and rear sides in an X direction. The vehicle body 11 of the four-way shuttle 1 is provided with a Y+ directional distance sensor 16 and a Y− directional distance sensor 15 respectively on front and rear sides in a Y direction.

The X+ directional distance sensor 17, the X− directional distance sensor 18, the Y+ directional distance sensor 16, and the Y− directional distance sensor 15 respectively detect distances between the four-way shuttle 1 in an operating direction of the four-way shuttle 1 and an obstacle. When the distances reach a first set value, the four-way shuttle 1 slows down. When the distances reach a second set value, the four-way shuttle 1 stops. The obstacle can be another four-way shuttle, a pallet, goods, or other obstacles that hinder movement of the four-way shuttle 1. Goods may be possibly stacked on the X direction track 21 and the Y direction tracks 22 because of a mis-operation.

As shown in FIG. 1 to FIG. 3, the pallets on the shelf supports 23 all carry goods. When the jacking structure 12 of the four-way shuttle 1 does not perform jacking, a gap exists between the jacking structure 12 of the four-way shuttle 1 and the pallets 3 placed on the shelf supports 23, so that the four-way shuttle 1 can freely pass below the pallets placed on the shelf supports 23. In a jacking state of the four-way shuttle 1, the jacking structure 12 of the four-way shuttle 1 jacks the pallets 3 with goods and cannot freely move below the pallets on the shelf supports 23. The jacking structure 12 of the four-way shuttle 1 is arranged at a topmost part of the four-way shuttle 1. The vehicle body 11 of the four-way shuttle 1 is arranged below the jacking structure 12. The vehicle body 11 is provided with wheels that match the X direction track 21 and each Y direction track 22, so that the four-way shuttle 1 can operate and move along the X direction track 21 and each Y direction track 22. The vehicle body 11 does not rise along with the jacking structure 12.

As shown in FIG. 1 to FIG. 3, the four-way shuttle 1 is provided with a liftable jacking structure 12. The jacking structure 12 is provided with a Y+ distance detection sensor 14 and a Y− distance detection sensor 13 respectively on front and rear sides in the Y direction. When the jacking structure 12 does not perform jacking and the four-way shuttle operates along the Y direction tracks 22 and the X direction track 21, the four-way shuttle can freely shuttle below the pallets 3. In a jacking state of the jacking structure 12, the Y+ distance detection sensor 14 and the Y− distance detection sensor 13 are at the same height with the pallets 3 supported on the shelf supports 23.

As shown in FIG. 2 to FIG. 3, the Y+ distance detection sensor 14, the Y− distance detection sensor 13, the Y+ directional distance sensor (16), the Y− directional distance sensor 15, the X+ directional distance sensor (17), and the X− directional distance sensor (18) all employ laser ranging sensors. The laser ranging sensors can only detect other four-way shuttles or other obstacles at the same height as the laser ranging sensors. That is, when the Y+ distance detection sensor (14) and Y− distance detection sensor (13) follow the jacking structure (12) to rise to the same height as the pallets (3) placed on the shelf supports (23), the Y+ distance detection sensor (14) and Y− distance detection sensor (13) can detect the presence of the pallets (3) on the shelf supports (23) of the Y direction tracks (22).

As shown in FIG. 2 to FIG. 3, when the four-way shuttle 1 operates on the X direction track 21, the X+ directional distance sensor 17 and the X− directional distance sensor 18 respectively detect distances between the four-way shuttle 1 and the obstacle in positive and negative directions of the X direction track. When the four-way shuttle 1 operates on each Y direction track 22, the Y+ directional distance sensor 16 and the Y− directional distance sensor 15 respectively detect distances between the four-way shuttle 1 and the obstacle in positive and negative directions of the Y direction track.

As shown in FIG. 2 to FIG. 3, when the four-way shuttle 1 jacks the pallets 3 with goods, the Y+ distance detection sensor 14 and the Y− distance detection sensor 13 are at the same height as the pallets 3 supported by the shelf supports 23. The Y+ distance detection sensor 14 and the Y− distance detection sensor 13 detect whether there are other pallets on the shelf supports 23 of the Y direction tracks 22 at the same height. When it is detected that distances between other pallets and the vehicle body 11 decrease to the first set value, the four-way shuttle 1 starts to slow down. When the distances between other pallets and the vehicle body 11 decrease to the second set value, the four-way shuttle 1 starts to brake and reduces its speed to 0, meaning that the four-way shuttle 1 stops or reaches a pallet placement position. Meanwhile, when the four-way shuttle 1 jacks the pallets with goods, the X+ directional distance sensor 17, the X− directional distance sensor 18, the Y+ directional distance sensor 16, and the Y− directional distance sensor 15 can also detect other four-way shuttles that are not in a jacking state on the X direction track and the Y direction tracks.

As shown in FIG. 2 to FIG. 3, when the jacking structure 12 is in a jacking state, the Y+ distance detection sensor 14 and the Y− distance detection sensor 13 respectively detect distances between the pallets 3 on the shelf supports 23 of the Y direction tracks 22 and the four-way shuttle 1.

As shown in FIG. 4 to FIG. 10, the obstacle avoidance and detection device for the vehicle body of the four-way shuttle and the pallet includes an obstacle avoidance and detection circuit for four-way shuttle. The obstacle avoidance and detection circuit for four-way shuttle includes a battery module 4, a PLC module, and an obstacle avoidance sensor module. The battery module 4 is electrically connected to the PLC module. The PLC module is electrically connected to the obstacle avoidance sensor module. Data detected by the obstacle avoidance sensor module is transmitted into the PLC module through a communication module of the PLC module.

Figure 4:
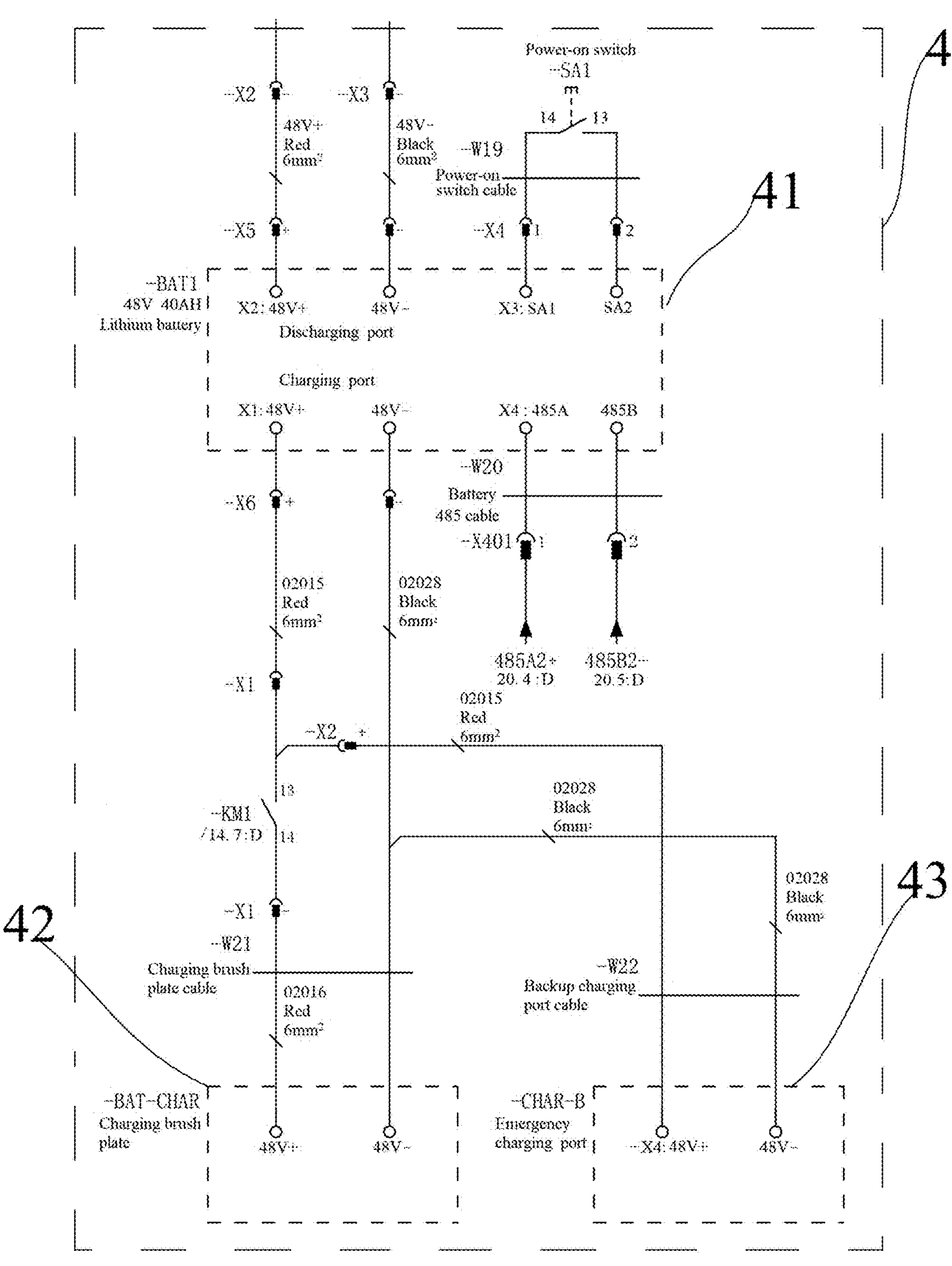
FIG. 4 is a schematic diagram of a battery module in a circuit.
Figure 5:
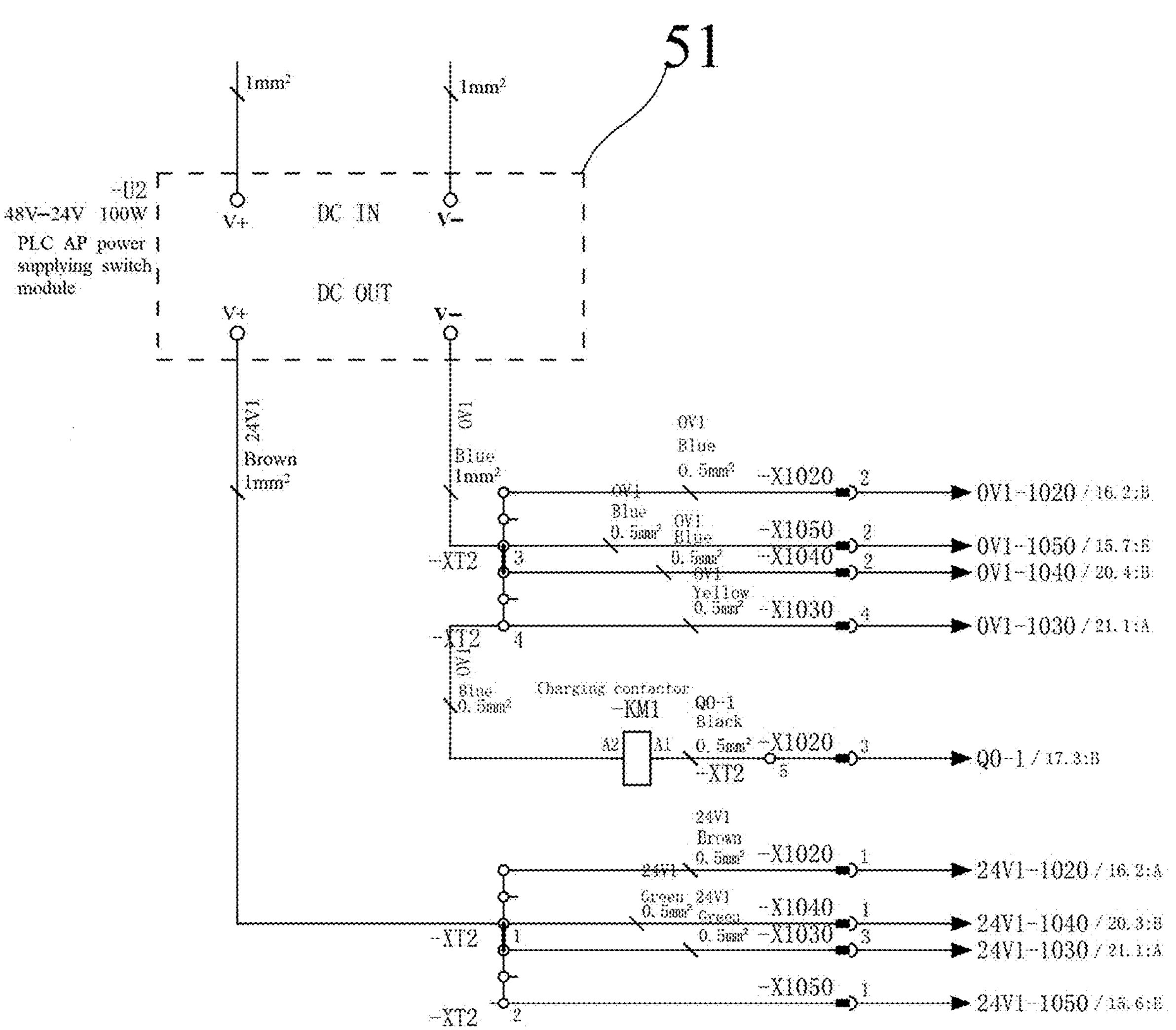
FIG. 5 is a schematic diagram of a PLC-AP power supplying switch module of a PLC module in a circuit.

As shown in FIG. 4, the battery module 4 includes a charging brush plate 42 and an emergency charging port 43. Positive and negative electrodes of both the charging brush plate 42 and the emergency charging port 43 are electrically connected to positive and negative electrodes of a charging port of a battery 41. The battery 41 in the four-way shuttle 1 is charged through the charging brush plate 42. The battery 41 includes a power-on switch which controls the discharging port of the battery 41 to perform discharging or stop discharging.

Figure 6:
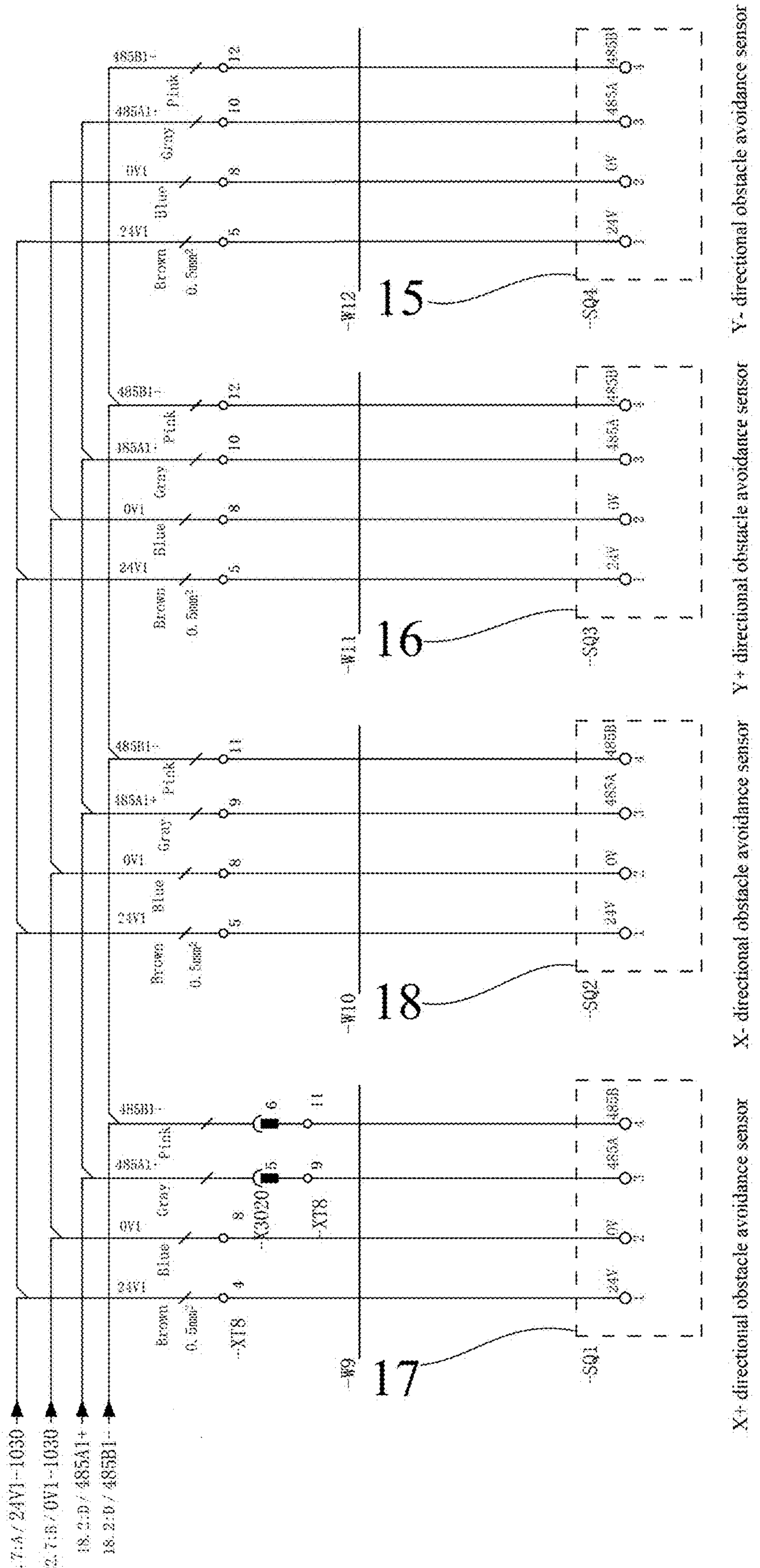
FIG. 6 is a circuit connection diagram of four laser ranging sensors on a vehicle body of a four-way shuttle.
Figure 7:
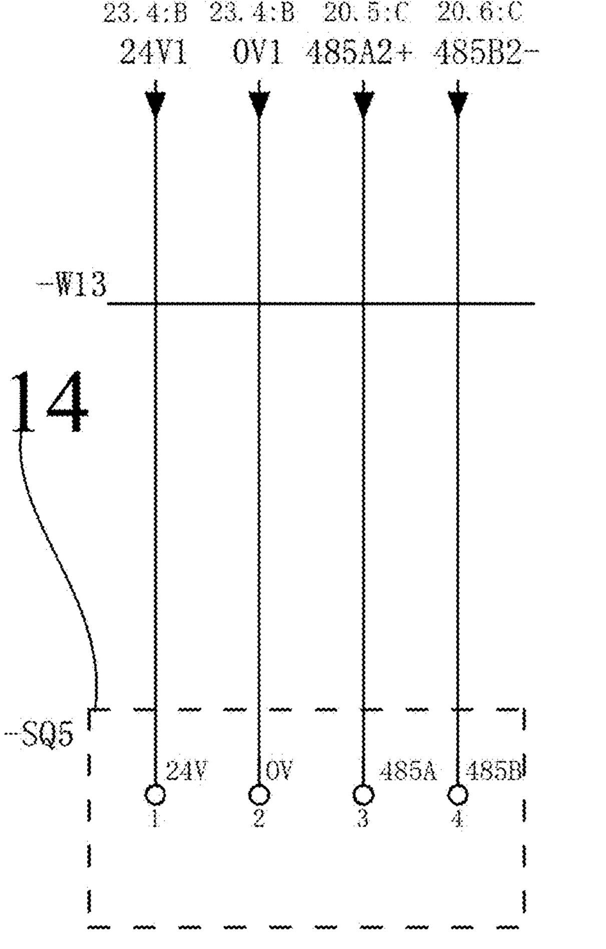
FIG. 7 is a circuit connection diagram of two distance detection sensors on a jacking structure of a four-way shuttle.

As shown in FIG. 6 to FIG. 7, the obstacle avoidance sensor module is composed of the Y+ distance detection sensor 14, the Y− distance detection sensor 13, the Y+ directional distance sensor 16, the Y− directional distance sensor 15, the X+ directional distance sensor 17, and the X− directional distance sensor 18. Each of the Y+ distance detection sensor 14, the Y− distance detection sensor 13, the Y+ directional distance sensor 16, the Y− directional distance sensor 15, the X+ directional distance sensor 17, and the X− directional distance sensor 18 includes power-source positive and negative electrodes, a 458A port, and a 458B port.

As shown in FIG. 4 to FIG. 10, the positive and negative electrodes of the discharging port of the battery 41 in the battery module 4 are respectively electrically connected to positive and negative electrodes of a DC IN end of a PLC-AP power supplying switch module 51 in the PLC module. Positive and negative electrodes of a DC OUT end of the PLC-AP power supplying switch module 51 are electrically connected to the Y+ distance detection sensor 14, the Y− distance detection sensor 13, the Y+ directional distance sensor 16, the Y− directional distance sensor 15, the X+ directional distance sensor 17, and the X− directional distance sensor 18.

Figure 8:
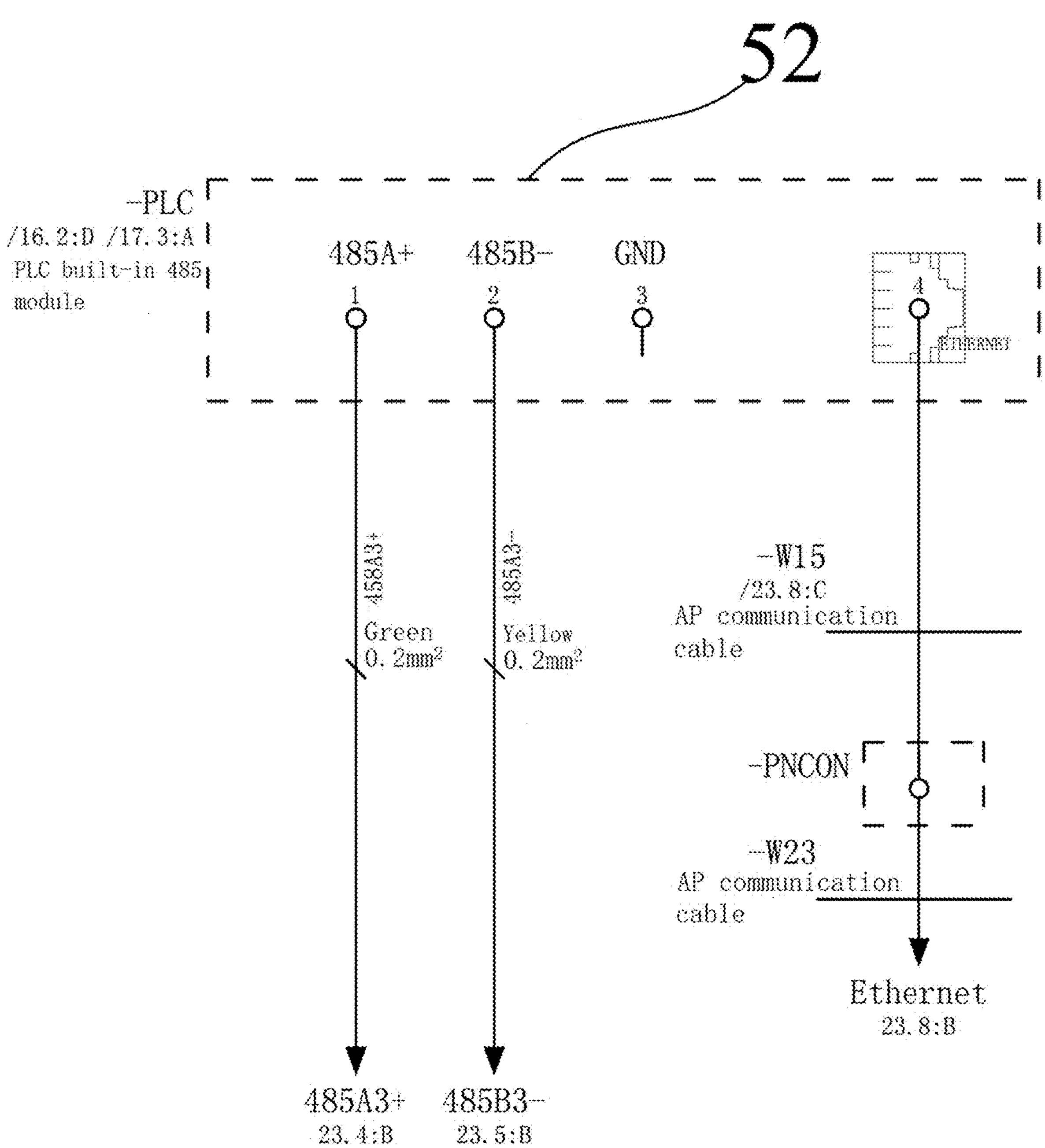
FIG. 8 is a circuit connection diagram of a first communication module.
Figure 9:
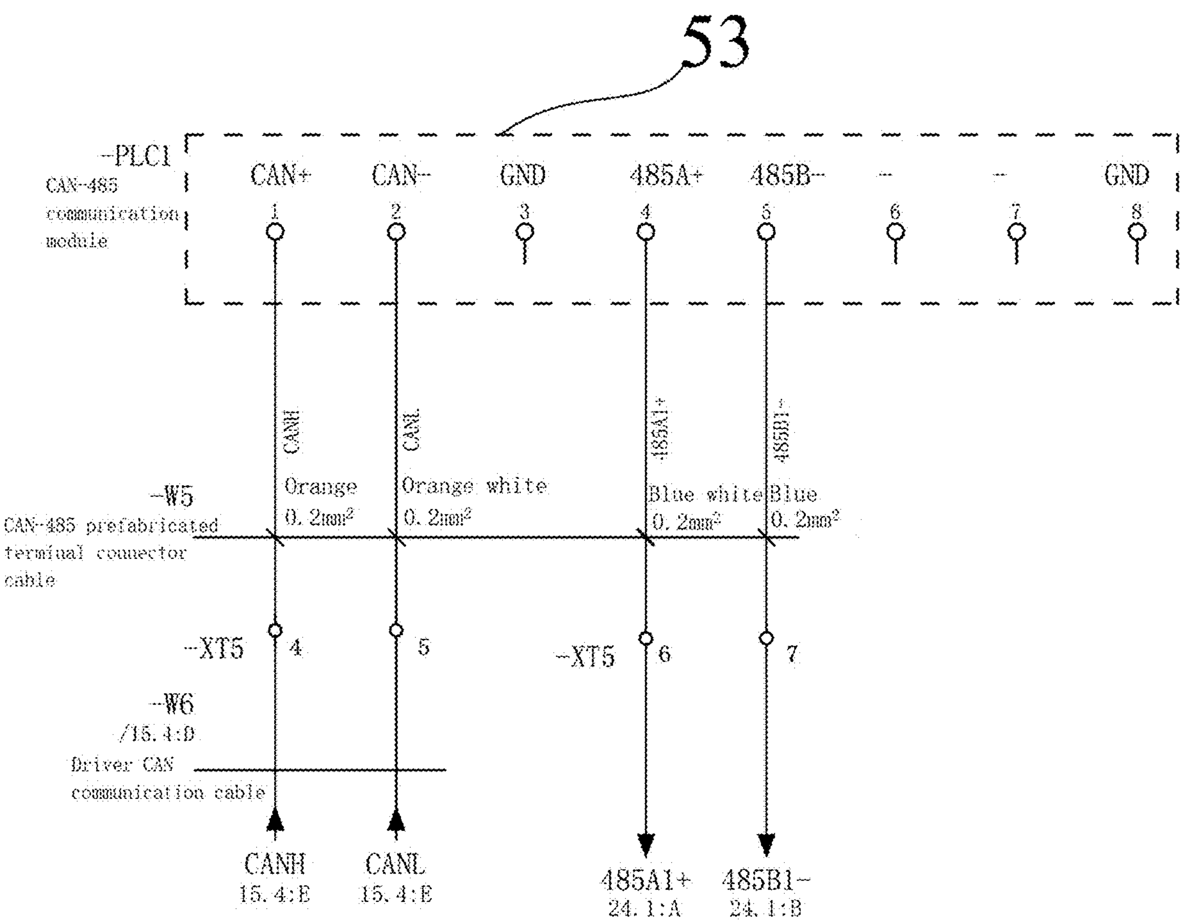
FIG. 9 is a circuit connection diagram of a second communication module.
Figure 10:
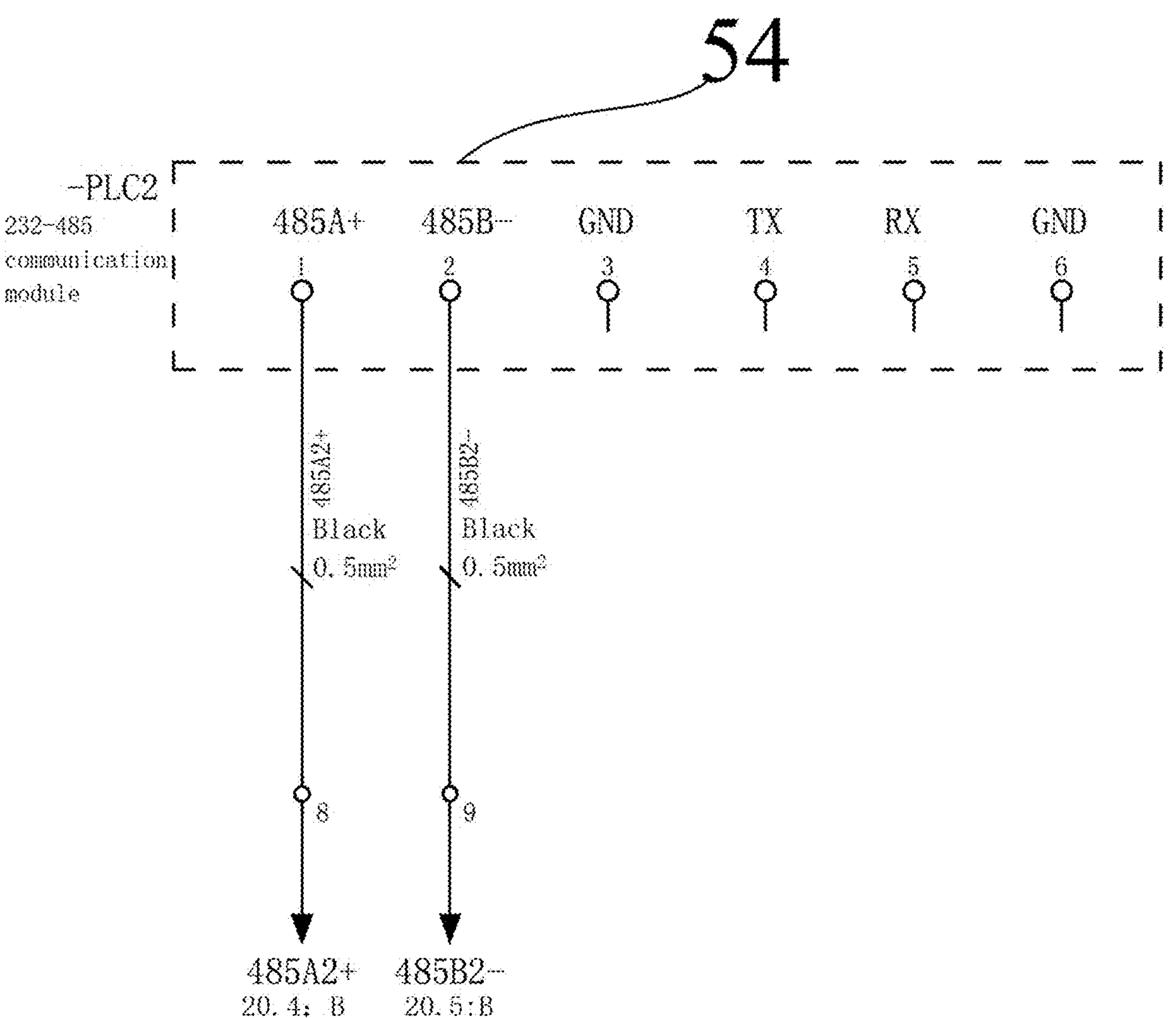
FIG. 10 is a circuit connection diagram of a third communication module.

As shown in FIG. 8 to FIG. 10, the PLC module includes a first communication module 53 and a second communication module 54. A 458A+ port of the first communication module 53 is electrically connected to the 458A ports of the Y+ directional distance sensor 16, the Y− directional distance sensor 15, the X+ directional distance sensor 17, and the X− directional distance sensor 18. A 458B− port of the first communication module 53 is electrically connected to the 458B ports of the Y+ directional distance sensor 16, the Y− directional distance sensor 15, the X+ directional distance sensor 17, and the X− directional distance sensor 18. A 458A+ port of the second communication module 54 is electrically connected to the 458A ports of both the Y+ distance detection sensor 14 and the Y− distance detection sensor 13. A 458B− port of the second communication module 54 is electrically connected to the 458B ports of both the Y+ distance detection sensor 14 and the Y− distance detection sensor 13. The 458A+ port of the second communication module 54 is electrically connected to a 458A port of the battery 41, and the 458B− port of the second communication module 54 is electrically connected to a 458B port of the battery 41, so that the PLC module can detect a state of the battery.

As shown in FIG. 8 to FIG. 10, a CAN+ end and a CAN− end of the first communication module 53 are respectively electrically connected to a CANH end and a CANL end of a driver. The PLC module further includes a third communication module 52. A 458A+ port and a 458B− port of the third communication module 52 are respectively electrically connected to the 458A+ port and 458− port of a remote controller box. An Ethernet port of the third communication module 52 is bidirectionally electrically connected to a network, and transmits data detected by all the distance detection sensors to the network after simple processing. For example, a quantity of pallets on a detected Y direction track is uploaded to the network, and information is reported to an inventory management system. The uploaded data is compared with originally recorded data on the network. When there is an error in the comparison, it can be determined that goods have been placed incorrectly, and a real-time feedback of an inventory error is provided. Adjustments can be made in time to correct the error.

When the four-way shuttle operates on the X direction track 21 and each Y direction track, if there is an obstacle in an operating direction, the four-way shuttle 1 can autonomously slow down and stop smoothly, thus avoiding collisions between vehicle bodies, and abnormal goods on the Y direction track 22 can also be identified. When the four-way shuttle 1 carrying goods operates on the Y direction track 22, the four-way shuttle 1 can identify an obstacle in an operating direction and can also identify a position with abnormal goods when goods inventory is abnormal. Meanwhile, the vehicle body autonomously slows down and stops to avoid collisions between goods pallets and collisions between four-way shuttles 1.

A working method of the obstacle avoidance and detection device for the vehicle body of the four-way shuttle and the pallet includes: When the jacking structure 12 of the four-way shuttle 1 does not perform jacking and the four-way shuttle 1 operates in a current direction, a laser ranging sensor in the current direction provides a real-time feedback of a distance between an obstacle in the current direction and the four-way shuttle 1. When the four-way shuttle 1 operates on the X direction track 21 or each Y direction track 22, the X+ directional distance sensor 17 and the X− directional distance sensor 18 detect a distance between the four-way shuttle 1 on the X direction track 21 and an obstacle in real time, or the Y+ directional distance sensor 16 and the Y− directional distance sensor 15 detect a distance between the four-way shuttle 1 on the X direction track 21 and the obstacle in real time. When it is detected that the distance between the four-way shuttle 1 and the obstacle reaches a first set value, the four-way shuttle 1 starts to slow down. When it is detected that the distance between the four-way shuttle 1 and the obstacle reaches a second set value, a speed of the four-way shuttle 1 is reduced to 0, namely, the four-way shuttle 1 stops operating and sounds an alarm.

When the jacking structure 12 of the four-way shuttle 1 jacks the pallets 3 and the four-way shuttle 1 operates on the X direction track 21, once the four-way shuttle 1 passes through each Y direction track 22 and is at an intersection between each Y direction track 22 and the X direction track 21, the Y+ distance detection sensor 14 and the Y− distance detection sensor 13 on the jacking structure 12 detect distances between the pallets 3 on the shelf supports 23 of each Y direction track 22 and the four-way shuttle 1 in real time; a quantity of pallets 3 on the shelf supports 23 is calculated and obtained based on the detected distances, and whether the pallets 3 with goods which are placed on the shelf supports 23 are abnormal is determined based on the quantity; and abnormal placement of the pallets 3 on the shelf supports 23 on each Y direction track 22 is detected. When the four-way shuttle 1 operates on each Y direction track 22, whether the pallets 3 placed on the shelf supports 23 are abnormal can also be detected. In this case, a specific position of the four-way shuttle 1 on the Y direction track 22 needs to be determined, and distances between the four-way shuttle 1 and the pallets 3 need to be calculated, thus calculating a quantity of pallets on the Y direction track 22. The detected quantity is then compared with an originally recorded quantity to determine whether goods are stacked abnormally.

The Y+ distance detection sensor 14 and the Y− distance detection sensor 13 detect the distances between the pallets 3 on the shelf supports 23 of each Y direction track 22 and the four-way shuttle 1. When the detected distances reach the first set value, the four-way shuttle 1 starts to slow down. When the detected distances reach the second set value, the four-way shuttle 1 stops and sounds an alarm to avoid loss caused by goods fall off from shelves because of collisions between pallets. When the four-way shuttle 1 stops on each Y direction track 22, the four-way shuttle 1 reaches a position at which the pallets are to be placed. The first set value is greater than the second set value, and the first set value and the second set value can be set based on an operating requirement of the four-way shuttle 1.

When the four-way shuttle 1 operates on each Y direction track 22, if pallets are placed incorrectly in a storage position, i.e. in the Y direction track 22, the four-way shuttle 1 can detect, through the Y+ distance detection sensor 14 and the Y− distance detection sensor 13, whether there are pallets in the storage position. Once a pallet is detected ahead, the four-way shuttle 1 can automatically slow down and stop and sound an alarm to avoid loss caused by goods fall off from shelves because of collisions between pallets.

When the jacking structure 12 of the four-way shuttle 1 jacks the pallets 3, the Y+ directional distance sensor 16, the Y− directional distance sensor 15, the X+ directional distance sensor 17, and the X− directional distance sensor 18 still detect the distance between the four-way shuttle 1 and the obstacle in real time, determine whether the distance reaches the first set value or the second set value, and cause the four-way shuttle 1 to slow down or stop. In this case, the Y+ directional distance sensor 16, the Y− directional distance sensor 15, the X+ directional distance sensor 17, and the X− directional distance sensor 18 detect a distance between another four-way shuttle that does not perform jacking and the four-way shuttle 1, or detect a distance between an obstacle that does not have a large height and the four-way shuttle 1, so as to avoid a collision danger.

Embodiment

Four directional distance sensors are arranged in four operating directions of the four-way shuttle 1, and two distance detection sensors are arranged in two directions of a Y direction track of the jacking structure 12. The six sensors are connected to the PLC module through 485 communication. When a software scheduling system of the four-way shuttle 1 has a vehicle body path conflict or the four-way shuttle 1 needs to give way at an intersection, the four-way shuttle 1 senses a vehicle body ahead through its own sensors at a bottom layer, and performs slow-down and stop actions, to avoid collisions between its vehicle body and another vehicle body.

When the four-way shuttle 1 moves on the X direction track 21 or each Y direction track 22, the distance sensors detect a movement direction of the four-way shuttle 1. When an obstacle has been detected and it is detected that a distance between the obstacle and the four-way shuttle 1 reaches or is less than the first set value, the four-way shuttle 1 starts to gradually slow down. Assuming that the obstacle is another four-way shuttle 1, when the another four-way shuttle 1 passes by, if the four-way shuttle 1 does not detect that the distance between the obstacle and the four-way shuttle 1 is greater than the first set value, the four-way shuttle 1 can speed up to its original running speed. When it is detected that the distance between the obstacle and the four-way shuttle 1 reaches or is less than the second set value, the four-way shuttle 1 gradually slows down and stop, and sounds an alarm to the obstacle ahead to prevent collisions between vehicle bodies.

When the four-way shuttle 1 is not in a jacking state, the six laser ranging sensors detect distances between another four-way shuttle in the movement direction and this four-way shuttle 1 to avoid collisions. When the four-way shuttle 1 is in a jacking state, four laser ranging sensors are on the vehicle body 11 of the four-way shuttle 1, and two laser ranging sensors are at the same height as the pallets 3 on the shelf supports 23. When the four-way shuttle 1 jacks a pallet with goods and the four-way shuttle 1 operates on the X direction track, the Y+ distance detection sensor 14 and the Y− distance detection sensor 13 of the four-way shuttle 1 detect the pallets 3 on the shelf supports 23 of the Y direction tracks on two sides and upload information to the inventory management system to detect placement errors of goods on shelves in real time. When the four-way shuttle 1 operates on each Y direction track, the Y+ distance detection sensor 14 and the Y− distance detection sensor 13 of the four-way shuttle 1 detect whether there are pallets 3 on the shelf supports 23 in the movement direction of the four-way shuttle 1, and detect distances, so that the four-way shuttle 1 slows down and brakes to stop, thus avoiding collisions between the four-way shuttle 1 and the pallets on the shelf supports 23.

When the jacking structure 12 of the four-way shuttle 1 jacks the pallets 3, the Y+ distance detection sensor 14 and the Y− distance detection sensor 13 of the four-way shuttle 1 detect distances between the pallets 3 on the shelf supports 23 of the Y direction track 22 and the four-way shuttle 1. Based on the distances, it determines how many goods are placed on the Y direction track 22, that is, how many pallets are placed. If it is detected that there are a pallets, but b pallets are recorded on a network, when a and b are not equal, it can be determined that there is an error in placement of goods and pallets with goods, and adjustment can be made in time. The X+ directional distance sensor 17, the X− directional distance sensor 18, the Y+ directional distance sensor 16, and the Y− directional distance sensor 15 of the four-way shuttle 1 detect distance data between the four-way shuttle 1 and another obstacle in the operating direction, and transmit the distance data to the PLC module. When the distance data reaches the first set value, the four-way shuttle slows down. When the distance data reaches the second set value, the four-way shuttle brakes.

The above description merely describes the preferred embodiments of the present disclosure. A person of ordinary skill in the art makes several modifications and optimizations based on the above disclosed content, without departing from the content of the above basic principle. These modifications and optimizations shall fall within the protection scope understood in the present disclosure.

What is claimed is:

1. An obstacle avoidance and detection device for a vehicle body of a four-way shuttle and a pallet, comprising a four-way shuttle (1), pallets (3) with goods, and Y direction tracks (22) and an X direction track (21) that are interlaced horizontally and longitudinally, wherein the four-way shuttle (1) operates in track directions of the Y direction tracks (22) and the X direction track (21); shelf supports (23) are arranged on two sides of the Y direction tracks (22); the pallets (3) are supported on the shelf supports (23); a vehicle body (11) of the four-way shuttle (1) is provided with an X+ directional distance sensor (17) and an X− directional distance sensor (18) respectively on front and rear sides in an X direction; the vehicle body (11) of the four-way shuttle (1) is provided with a Y+ directional distance sensor (16) and a Y− directional distance sensor (15) respectively on front and rear sides in a Y direction;

the X+ directional distance sensor (17), the X− directional distance sensor (18), the Y+ directional distance sensor (16), and the Y− directional distance sensor (15) respectively detect distances between the four-way shuttle (1) in an operating direction of the four-way shuttle (1) and an obstacle; when the distances reach a first set value, the four-way shuttle (1) slows down; and when the distances reach a second set value, the four-way shuttle (1) stops;

wherein the four-way shuttle (1) is provided with a liftable jacking structure (12); the jacking structure (12) is provided with a Y+ distance detection sensor (14) and a Y− distance detection sensor (13) respectively on front and rear sides in the Y direction; when the jacking structure (12) does not perform jacking and the four-way shuttle operates along the Y direction tracks (22) and the X direction track (21), the four-way shuttle freely shuttles below the pallets (3); and in a jacking state of the jacking structure (12), the Y+ distance detection sensor (14) and the Y− distance detection sensor (13) are at the same height as the pallets (3) supported on the shelf supports (23).

2. The obstacle avoidance and detection device for the vehicle body of the four-way shuttle and the pallet according to claim 1, wherein when the four-way shuttle (1) operates on the X direction track (21), the X+ directional distance sensor (17) and the X− directional distance sensor (18) respectively detect distances between the four-way shuttle (1) and the obstacle in positive and negative directions of the X direction track; and when the four-way shuttle (1) operates on each Y direction track (22), the Y+ directional distance sensor (16) and the Y− directional distance sensor (15) respectively detect distances between the four-way shuttle (1) and the obstacle in positive and negative directions of the Y direction track.

3. The obstacle avoidance and detection device for the vehicle body of the four-way shuttle and the pallet according to claim 1, wherein in a jacking state of the jacking structure (12), the Y+ distance detection sensor (14) and the Y− distance detection sensor (13) respectively detect distances between the pallets (3) on the shelf supports (23) on the Y direction tracks (22) and the four-way shuttle (1).

4. The obstacle avoidance and detection device for the vehicle body of the four-way shuttle and the pallet according to claim 1, comprising an obstacle avoidance and detection circuit for four-way shuttle, wherein the obstacle avoidance and detection circuit for four-way shuttle comprises a battery module (4), a programmable logic controller (PLC) module, and an obstacle avoidance sensor module; the battery module (4) is electrically connected to the PLC module; the PLC module is electrically connected to the obstacle avoidance sensor module; and data detected by the obstacle avoidance sensor module is transmitted into the PLC module through a communication module of the PLC module.

5. The obstacle avoidance and detection device for the vehicle body of the four-way shuttle and the pallet according to claim 4, wherein the obstacle avoidance sensor module is composed of the Y+ distance detection sensor (14), the Y− distance detection sensor (13), the Y+ directional distance sensor (16), the Y− directional distance sensor (15), the X+ directional distance sensor (17), and the X− directional distance sensor (18).

6. The obstacle avoidance and detection device for the vehicle body of the four-way shuttle and the pallet according to claim 5, wherein positive and negative electrodes of a discharging port of a battery (41) in the battery module (4) are respectively electrically connected to positive and negative electrodes of a DC IN end of a PLC-AP power supplying switch module (51) in the PLC module; and positive and negative electrodes of a DC OUT end of the PLC-AP power supplying switch module (51) are electrically connected to the Y+ distance detection sensor (14), the Y− distance detection sensor (13), the Y+ directional distance sensor (16), the Y− directional distance sensor (15), the X+ directional distance sensor (17), and the X− directional distance sensor (18).

7. A working method of the obstacle avoidance and detection device for the vehicle body of the four-way shuttle and the pallet according to claim 1, comprising: when the jacking structure (12) of the four-way shuttle (1) does not perform jacking and the four-way shuttle (1) operates on the X direction track (21) or each Y direction track (22), detecting a distance between the four-way shuttle (1) on the X direction track (21) and an obstacle in real time by the X+ directional distance sensor (17) and the X− directional distance sensor (18), or detecting a distance between the four-way shuttle (1) on the X direction track (21) and the obstacle in real time by the Y+ directional distance sensor (16) and the Y− directional distance sensor (15); when it is detected that the distance between the four-way shuttle (1) and the obstacle reaches the first set value, causing the four-way shuttle (1) to start to slow down; when it is detected that the distance between the four-way shuttle (1) and the obstacle reaches the second set value, reducing a speed of the four-way shuttle (1) to 0;

when the jacking structure (12) of the four-way shuttle (1) jacks the pallets (3) and the four-way shuttle (1) operates on the X direction track (21), detecting distances between the pallets (3) on the shelf supports (23) of the Y direction tracks (22) and the four-way shuttle (1) in real time by the Y+ distance detection sensor (14) and the Y− distance detection sensor (13) on the jacking structure (12), obtaining a quantity of pallets (3) on the shelf supports (23) based on the detected distances, and determining, based on the quantity, whether the pallets (3) with goods which are placed on the shelf supports (23) are abnormal; when the four-way shuttle (1) operates on each Y direction track (22), detecting whether the pallets (3) which are placed on the shelf supports (23) are abnormal; detecting distances between the pallets (3) on the shelf supports (23) of the Y direction tracks (22) and the four-way shuttle (1) in real time by the Y+ distance detection sensor (14) and the Y− distance detection sensor (13); when the detected distances reach the first set value, causing the four-way shuttle (1) to start to slow down; and when the detected distances reach the second set value, causing the four-way shuttle (1) to stop.

8. The working method of the obstacle avoidance and detection device for the vehicle body of the four-way shuttle and the pallet according to claim 7, wherein when the jacking structure (12) of the four-way shuttle (1) jacks the pallets (3), the Y+ directional distance sensor (16), the Y− directional distance sensor (15), the X+ directional distance sensor (17), and the X− directional distance sensor (18) still detect the distance between the four-way shuttle (1) and the obstacle in real time to determine whether the distance reaches the first set value or the second set value, to slow down or stop the four-way shuttle (1).

* * * * *